(12) United States Patent
Chan et al.

(10) Patent No.: US 11,599,404 B2
(45) Date of Patent: Mar. 7, 2023

(54) CORRELATION-BASED MULTI-SOURCE PROBLEM DIAGNOSIS

(71) Applicant: International Business Machines Corporation, Armonk, NY (US)

(72) Inventors: Yuk L. Chan, Rochester, NY (US); Tian Wu, Beijing (CN); Jia Qi Li, Beijing (CN); Zhi Shuai Han, Beijing (CN); Lei Yu, Sleepy Hollow, NY (US); Hong Min, Hopewell Junction, NY (US); Fan Jing Meng, Beijing (CN); Abhishek Dokania, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 17/110,438

(22) Filed: Dec. 3, 2020

(65) Prior Publication Data

US 2022/0179729 A1    Jun. 9, 2022

(51) Int. Cl.
*G06F 11/07*     (2006.01)
*G06F 16/245*    (2019.01)
*G06Q 10/10*     (2012.01)

(52) U.S. Cl.
CPC ........ *G06F 11/0781* (2013.01); *G06F 11/076* (2013.01); *G06F 11/079* (2013.01); *G06F 16/245* (2019.01); *G06Q 10/10* (2013.01)

(58) Field of Classification Search
CPC ... G06F 11/079; G06F 11/076; G06F 11/0781
See application file for complete search history.

(56) References Cited

U.S. PATENT DOCUMENTS

| 6,349,290 B1 | 2/2002 | Horowitz et al. |
| 7,506,195 B2 | 3/2009 | Takahashi et al. |

(Continued)

FOREIGN PATENT DOCUMENTS

| CN | 101325520 B | 8/2010 |
| CN | 103761173 A | 4/2014 |

(Continued)

OTHER PUBLICATIONS

Chen et al.; "Correlated Anomaly Detection From Large Streaming Data", BigData IEEE International Conference On, pp. 1-11, Dec. 10-13, 2018.

(Continued)

*Primary Examiner* — Jigar P Patel
(74) *Attorney, Agent, or Firm* — Cantor Colburn LLP; Teddi Maranzano (57) ABSTRACT

According to an aspect, a method includes searching for a correlated log identifier in a correlation database based on detecting a metrics-based anomaly. The method also includes providing, in a problem diagnosis, related log information associated with the correlated log identifier based on locating one or more log entries including the correlated log identifier in a same time window as the metrics-based anomaly. The method further includes searching for a correlated metric in the correlation database based on detecting a log-based anomaly and providing, in the problem diagnosis, related metric information associated with the correlated metric based on locating one or more metrics records including the correlated metric in the same time window as the log-based anomaly.

12 Claims, 8 Drawing Sheets

(56) References Cited

U.S. PATENT DOCUMENTS

| | | | |
|---|---|---|---|
| 7,742,875 | B2 | 6/2010 | Li et al. |
| 7,856,575 | B2 | 12/2010 | Bock et al. |
| 7,860,815 | B1 | 12/2010 | Tangirala |
| 8,065,336 | B2 | 11/2011 | Armstrong et al. |
| 8,229,953 | B2 | 7/2012 | Kapuram et al. |
| 8,495,429 | B2 | 7/2013 | Fu et al. |
| 9,086,944 | B2 | 7/2015 | Lentile et al. |
| 9,164,983 | B2 | 10/2015 | Liu et al. |
| 9,215,164 | B2 | 12/2015 | Scharf et al. |
| 9,225,730 | B1 | 12/2015 | Brezinski |
| 9,244,755 | B2 | 1/2016 | Huang et al. |
| 9,298,453 | B2 | 3/2016 | Vangala et al. |
| 9,354,961 | B2 | 5/2016 | Nagura et al. |
| 9,367,809 | B2 | 6/2016 | Puri et al. |
| 9,413,837 | B2 | 8/2016 | Vaccari et al. |
| 9,633,106 | B1 | 4/2017 | Saurabh et al. |
| 9,710,322 | B2 | 7/2017 | Jewell et al. |
| 9,734,005 | B2 | 8/2017 | Ruan et al. |
| 9,772,898 | B2 | 9/2017 | Deshpande et al. |
| 9,811,795 | B1 | 11/2017 | Kearns et al. |
| 9,891,983 | B1 | 2/2018 | Dechiaro |
| 9,984,060 | B2 | 5/2018 | Bhattacharya et al. |
| 9,984,148 | B2 | 5/2018 | Lee et al. |
| 10,042,613 | B2 | 8/2018 | Castielli et al. |
| 10,042,697 | B2 | 8/2018 | Ahad |
| 10,083,073 | B2 | 9/2018 | Ambichl et al. |
| 10,120,747 | B2 | 11/2018 | Cunico et al. |
| 10,133,568 | B2 | 11/2018 | He et al. |
| 10,140,287 | B2 | 11/2018 | Dasgupta et al. |
| 10,140,576 | B2 | 11/2018 | Eldardiry et al. |
| 10,142,357 | B1 | 11/2018 | Tamersoy et al. |
| 10,162,696 | B2 | 12/2018 | Kogan-Katz et al. |
| 10,169,731 | B2 | 1/2019 | Brew et al. |
| 10,193,533 | B2 | 1/2019 | Chen et al. |
| 10,270,668 | B1 | 4/2019 | Thompson et al. |
| 10,303,533 | B1 | 5/2019 | Panov et al. |
| 10,318,541 | B2 | 6/2019 | Bingham et al. |
| 10,339,457 | B2 | 7/2019 | Ryckbosch et al. |
| 10,346,229 | B2 | 7/2019 | Tee et al. |
| 10,346,758 | B2 | 7/2019 | Natsumeda |
| 10,402,255 | B1 | 9/2019 | Niyogi |
| 10,467,318 | B2 | 11/2019 | Truitt et al. |
| 10,523,520 | B2 | 12/2019 | Aggarwal et al. |
| 10,552,289 | B2 | 2/2020 | Ilangovan et al. |
| 10,585,774 | B2 | 3/2020 | Chen et al. |
| 10,616,038 | B2 | 4/2020 | Kushmerick et al. |
| 10,628,747 | B2 | 4/2020 | Chen et al. |
| 10,637,745 | B2 | 4/2020 | Naous |
| 10,664,535 | B1* | 5/2020 | Hahn .................. G06F 16/9535 |
| 10,673,721 | B2 | 6/2020 | Hashimoto et al. |
| 10,701,096 | B1 | 6/2020 | Johnston et al. |
| 11,347,622 | B1 | 5/2022 | Agarwal et al. |
| 2004/0249821 | A1 | 12/2004 | Nies et al. |
| 2011/0087924 | A1 | 4/2011 | Kandula et al. |
| 2011/0083123 | A1 | 5/2011 | Lou et al. |
| 2013/0124923 | A1 | 5/2013 | Wang et al. |
| 2014/0365575 | A1 | 12/2014 | Spaven et al. |
| 2016/0124823 | A1 | 5/2016 | Ruan et al. |
| 2016/0253229 | A1 | 9/2016 | Sade et al. |
| 2016/0307285 | A1 | 10/2016 | Gallagher |
| 2017/0013003 | A1 | 1/2017 | Samuni et al. |
| 2017/0228460 | A1 | 8/2017 | Amel et al. |
| 2018/0041500 | A1 | 2/2018 | Menahem et al. |
| 2018/0144041 | A1 | 5/2018 | Chen et al. |
| 2018/0211197 | A1 | 7/2018 | Vosseler et al. |
| 2018/0219723 | A1 | 8/2018 | Scarpelli et al. |
| 2018/0308001 | A1 | 10/2018 | Doddala et al. |
| 2018/0359530 | A1 | 12/2018 | Marlow et al. |
| 2019/0073257 | A1 | 3/2019 | Dasgupta et al. |
| 2019/0114244 | A1 | 4/2019 | Salunke et al. |
| 2019/0188286 | A1 | 6/2019 | Chan et al. |
| 2019/0250970 | A1 | 8/2019 | Gupta et al. |
| 2019/0356533 | A1 | 11/2019 | Vasseur et al. |
| 2019/0391863 | A1 | 12/2019 | Ofer et al. |
| 2020/0076841 | A1 | 3/2020 | Hajimirsadeghi et al. |
| 2020/0084085 | A1 | 3/2020 | Tucker et al. |
| 2020/0104775 | A1 | 4/2020 | Chintalapati et al. |
| 2020/0117668 | A1 | 4/2020 | Chamarajnagar |
| 2020/0142954 | A1 | 5/2020 | Mandalia et al. |
| 2020/0167350 | A1 | 5/2020 | Miller et al. |
| 2020/0201701 | A1 | 6/2020 | Wang et al. |
| 2020/0226362 | A1 | 7/2020 | Hu et al. |
| 2020/0380408 | A1 | 12/2020 | Sridhar et al. |
| 2021/0064500 | A1 | 3/2021 | Przestrzelski |
| 2021/0306361 | A1 | 9/2021 | Tanaka et al. |
| 2021/0342313 | A1* | 11/2021 | Riddell ................. G06F 7/5443 |
| 2021/0382770 | A1* | 12/2021 | Lu ........................ G06F 11/079 |
| 2022/0269554 | A1* | 8/2022 | Saxena ............... G06F 11/0787 |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| CN | 113434357 A | 9/2021 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | 2020023787 A1 | 7/2019 |

OTHER PUBLICATIONS

Du, M. et al., "DeepLog: Anomaly Detection and Diagnosis from System Logs through Deep Learning," Session F2 nsights from Log(in)s CCS'17, Oct. 30-Nov. 3, 2017, Dallas, TX, USA, 14 pages.

Eldardiry et al.; "Multi-Source Fusion For Anomaly Detection: Using across-domain and across-time peer-group consistency checks", JoWUA Journal Of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference On, pp. 1-11, Nov. 2-5, 2016.

Gao et al.; "Modeling Probabilistic Measurement Correlations for Distributed Systems", ICDCS IEEE 29th International Conference On, pp. 623-630, Jun. 22-26, 2009.

Leman Akoglu et al, "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 14, 2021; 2 pages.

Madireddy et al.; "Analysis and Correlation of Application I/O Performance and System-Wide I/O Activity", Argonne National Laboratory, pp. 1-12, Apr. 2017.

Peiris et al.; "PAD: Performance Anomaly Detection In Multi-Server Distributed Systems", Cloud IEEE 7th International Conference On, pp. 769-776, Jun. 27-Jul. 2, 2014.

Peng et al.; "CM-GANs: Cross-Modal Generative Adversarial Networks for Common Representation Learning", Cornell University Library, arXiv:1710.05106v2,pp. 1-13,Apr. 26, 2018.

Song, Lei; "Informative Correlation Extraction From and for Forex Market Analysis", Auckland University of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan, P202005896US01.

Yuk L. Chan et al., "Graph-Based Log Sequence Anomaly Detection and Problem Diagnosis," U.S. Appl. No. 17/110,535; filed Dec. 3, 2020.

Yuk L. Chan et al., "Integrating Documentation Knowledge With Log Mining for System Diagnosis," U.S. Appl. No. 17/110,430; filed Dec. 3, 2020.

Yuk L. Chan et al., "Log-Based Status Modeling and Problem Diagnosis for Distributed Applications," U.S. Appl. No. 17/110,513; filed Dec. 3, 2020.

Yuk L. Chan et al., "Message Correlation Extration for Mainframe Operation," U.S. Appl. No. 17/110,431; filed Dec. 3, 2020.

Yuk L. Chan et al., "Message-Based Event Grouping for a Computing Operation ," U.S. Appl. No. 17/110,460; filed Dec. 3, 2020.

(56) References Cited

OTHER PUBLICATIONS

Yuk L. Chan et al., "Message-Based Problem Diagnosis and Root Cause Analysis," U.S. Appl. No. 17/110,458; filed Dec. 3, 2020.
Zhong et al.; "An Improved Correlation-Based Anomaly Detection Approach for Condition Monitoring Data of Industrial Equipment", ICPHM IEEE Inter. Conf. On, pp. 1-6, Jun. 20-22, 2016.
Metric Pair Log Frequency Correlation—Google Scholar/Patents search—text refined (year: 2022).

* cited by examiner

| Time 401 | JOB_ID 402 | MESSAGE_ID 404 | MESSAGE_TEXT 406 |
|---|---|---|---|
| > Jan 13, 2020 03:19:43.270 | EB9AC T0A | | D A, CNMS |
| > Jan 13, 2020 03:19:43.270 | EB9AC T0A | CNZ4106I | CNZ4106I 03.19.43 DISPLAY ACTIVITY<br>OAS 00003   00033   00000<br>6 L   NSW S0  A=0029   PER=NO<br>SMC E<br>WUID=STC27663  USERID=SNMSTASK<br>RGP=N/A   ARVR=NO  QSC=NO<br>DSPNAME=AOFTREE ASTF=709D7EAA |
| > Jan 13, 2020 03:19:43.750 | EB9AC T0A | | D IPLINFO |
| > Jan 13, 2020 03:19:43.750 | EB9AC T0A | IEE254I | IEE2541 03.19.43 IPLINFO DISPLAY<br>LICENSE = z/OS    USED LOADING IN S<br>L) IEASYS LIST = (00,P1) (OP) I(<br>51B) CURRENT(0951B) VOLUME(<br>SPIRL1) |
| > Jan 13, 2020 03:19:43.750 | EB9AC T0A | | D M=CPU |
| > Jan 13, 2020 03:19:43.750 | EB9AC T0A | IEE174I | IEE174I 03.19.43 DISPLAY M CORE S1<br>ISCM   CPU THREAD STATUS 0000   + |

408 (points to EB9AC T0A in row 1)

CORRELATION-BASED MULTI-SOURCE PROBLEM DIAGNOSIS

BACKGROUND

The present invention generally relates to computer systems, and more specifically, to computer systems, computer-implemented methods, and computer program products for correlation-based multi-source problem diagnosis.

In computing, different types of logs can be generated during system operation to record various events. The logs typically contain text data and may also include numeric data. Computer systems may also have various performance monitors that track resource utilization, such as memory, disk, processor, thread count, and other such metrics. Metric data may be packed into records, where record fields can be of various data types, sizes, and offset locations. Where metric data is packed or encoded as binary values, it may not be readily interpreted directly by computer system users. Metric data can be precise but is typically generalized numeric information. Log data and metric data can be generated at different time scales and separately managed through different system monitoring and reporting tools. Further, log data can include a large amount of text covering a wide variety of events, making it a "noisy" data source.

SUMMARY

Embodiments of the present invention are directed to multi-source data correlation extraction for anomaly detection. A non-limiting example computer-implemented method includes searching for a correlated log identifier in a correlation database based on detecting a metrics-based anomaly. The method also includes providing, in a problem diagnosis, related log information associated with the correlated log identifier based on locating one or more log entries including the correlated log identifier in a same time window as the metrics-based anomaly. The method further includes searching for a correlated metric in the correlation database based on detecting a log-based anomaly and providing, in the problem diagnosis, related metric information associated with the correlated metric based on locating one or more metrics records including the correlated metric in the same time window as the log-based anomaly.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention are configured to perform correlation-based multi-source problem diagnosis of one or more monitored computer systems. Relationships between multiple metrics and log data associated with one or more monitored computer systems can be stored in a correlation database, which may be searchable by metrics and/or log identifiers to assist in locating supporting evidence of a detected anomaly. For example, a problem or anomaly can be detected based on one or more system monitors configured to track performance variations, faults, and various instances of abnormal events. An anomaly may be reported with a relative confidence level. For instance, a read or write failure may have a high confidence of being an anomaly, while an extended timeout or latent response may have a lower confidence of being an anomaly. Over-reporting of anomalies can occur where system monitors generate anomaly alerts for conditions that are not actual problems. False positives can result in unnecessary dedication of resources to search for the root cause of an event that was not an actual anomaly.

One or more embodiments can perform metrics-based anomaly detection and log-based anomaly detection to assist in confirming whether a detected anomaly has other supporting data available to assist in problem diagnosis. When a metrics-based anomaly is detected, a correlation database can be searched for other relationships relative to one or more metrics and/or log identifiers. If correlated metrics or log identifiers are found, the correlated metrics or log identifiers can be used to search metrics records or log entries occurring in a same time window to locate further evidence of the anomaly. Similarly, when a log-based anomaly is detected, the correlation database can be searched for other relationships relative to one or more metrics and/or log identifiers. If correlated log identifiers or metrics are found, the correlated log identifiers or metrics can be used to search log entries or metrics records occurring in a same time window to locate further evidence of the anomaly. In another embodiment, the correlated metrics or logs can be analyzed further, using a technique that can identify the useful evidence or rank a list of correlated information based on the relationship with the anomaly. In one embodiment, an analytic system can allow anomaly detection at a lower confidence level and identify more anomalies. The results can allow a user to quickly use the ranked evidence to determine if an anomaly is a true positive or false positive. This allows the anomaly detection system to reduce the chance of missing a true positive and change the impact of the false positives. For example, an anomaly detection system for a metric may use standard deviation to detect deviation of a data point. The further the metric deviates from the mean, the metric can be considered as more abnormal. In an example system, three standard deviations may be used as a threshold for an "anomaly". If a user desires to reduce false positives, the user can increase the threshold to four standard deviations or more. However, this can also increase the chance of missing true positives.

In one embodiment, a system, environment, data or anomaly detection technique may produce an anomaly detection result at a high confident level, while another may produce a result at a low confidence level. The choice of a specific metric, type of logs to analyze, and choice of evidence can depend on the resulting anomaly detection confidence level. For example, for a transaction processing system, analyzing the transaction response time can produce high confidence anomaly detection results compared to other metrics, such as processor delay, I/O delay, processor utilization, paging, and the like. Metrics, such as processor delay, I/O delay, processor utilization, and paging rate can be used to help explain high transaction response times. Based on these metrics, a user can understand the cause of a high response time. Typically, I/O delay and paging rate can fluctuate on a system and may be considered as an anomaly, because the metrics can be affected by other workloads on the same system. Detecting an anomaly from I/O delay and paging rate is not typically feasible because of the frequent fluctuations. Detecting an anomaly from transaction response times, then ranking the I/O delay and paging rate within the same time period can provide evidence for a high transaction response time while minimizing the impact of anomaly detection from the I/O delay and paging. In another example, a system may show high processor utilization in metrics data, while log data shows a message for "retrying network connection". Typically, detecting an anomaly related to high processor utilization may not immediately indicate any problem, because it could be driven by increased website traffic. Furthermore, "retrying network connection" could happen often based on the network configuration of the system. Detecting an anomaly from logs for "retrying network connection" may not be feasible because of the frequent anomalies. On the other hand, an anomaly detected based on processor utilization may be less frequent, because a website stable can have workload. Detecting an anomaly from CPU utilization, then using an anomaly detected from the log within the time period can provide evidence for the high CPU utilization while reducing the impact of the anomaly detection from the logs.

Figure 1:
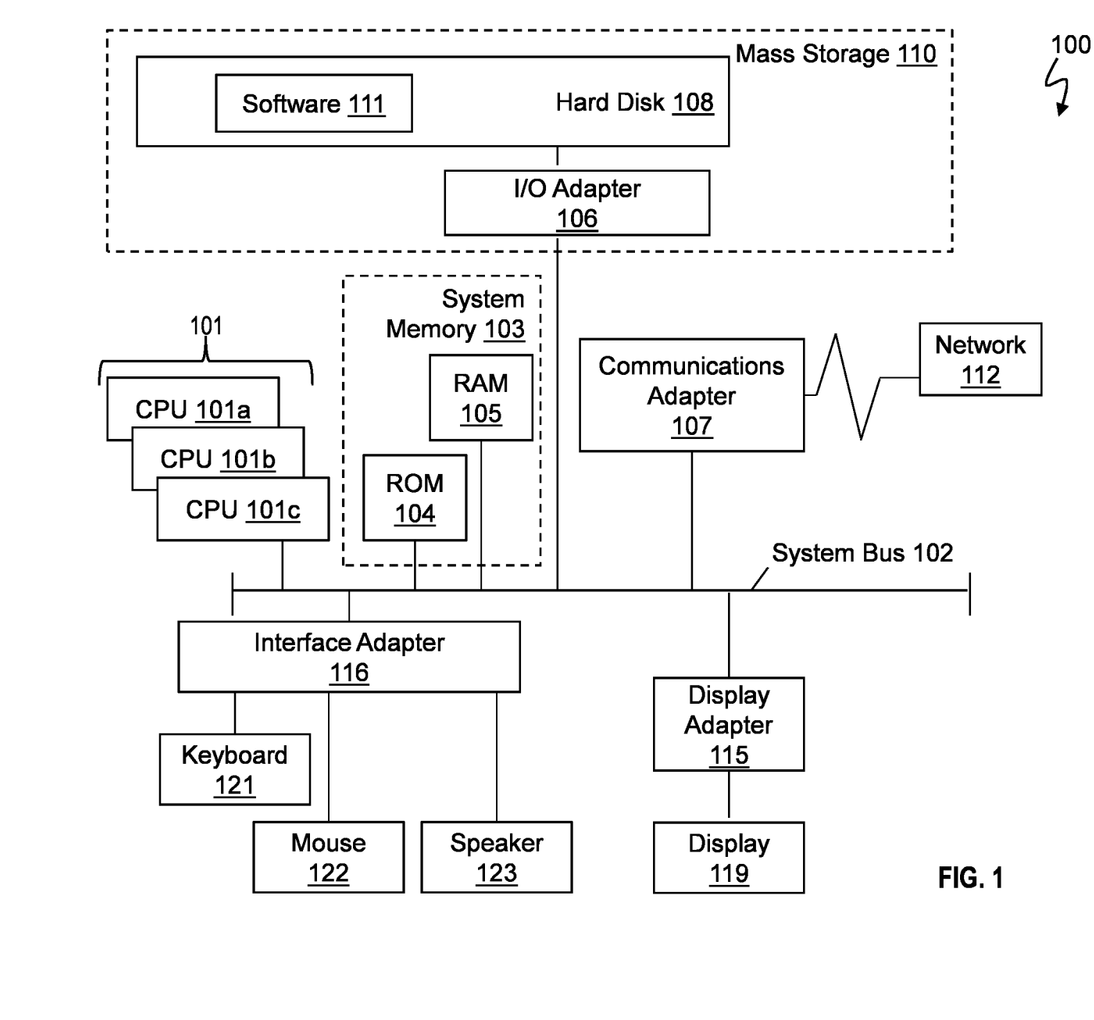
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit.

Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
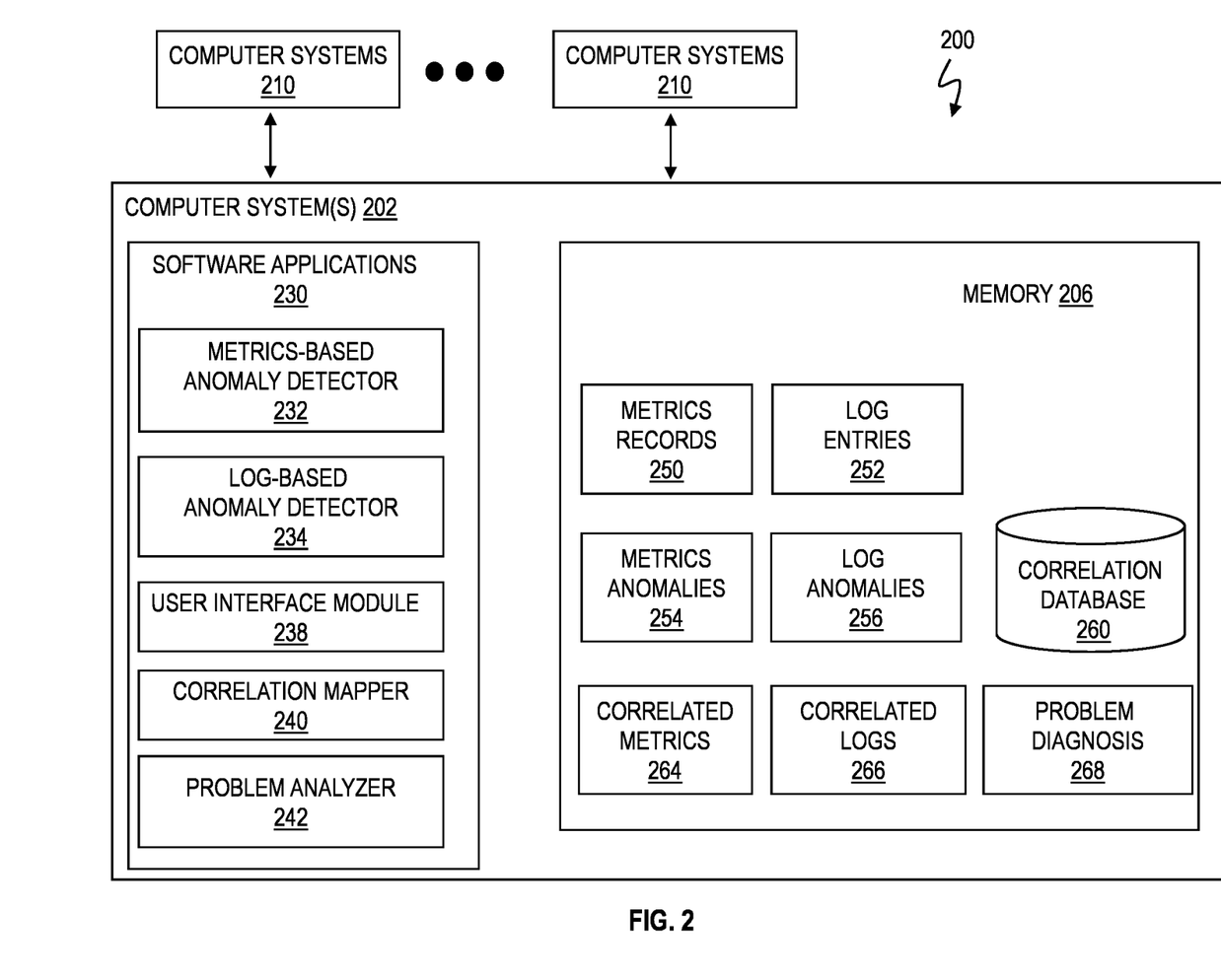
FIG. 2 is a block diagram of a system for correlation-based multi-source problem diagnosis in accordance with one or more embodiments of the present invention.

FIG. 2 is a block diagram of a system 200 for correlation-based multi-source problem diagnosis in accordance with one or more embodiments of the present invention. FIG. 2 depicts one or more computer systems 202 coupled to one or more computer systems 210 via a wired and/or wireless network. For example, computer system 202 can be representative of numerous computers in a datacenter servicing various users, and computer systems 210 can be representative of numerous computers in a datacenter. One or more of the computer systems 202 can be configured to collect metrics and logs associated with the operation of one or more of the computer systems 210, where the computer systems 210 can also be referred to as monitored computer systems 210. The monitored computer systems 210 may be observed to collect representative performance data and events during operation of the system 200. Elements of the computer system 100 of FIG. 1 may be used in and/or integrated into computer systems 202 and computer systems 210. One or more software applications 230 can include a metrics-based anomaly detector 232, a log-based anomaly detector 234, a user interface module 238, a correlation mapper 240, and a problem analyzer 242. The software applications 230 may utilize and/or be implemented as software 111 executed on one or more processors 101, as discussed in FIG. 1.

Figure 3:
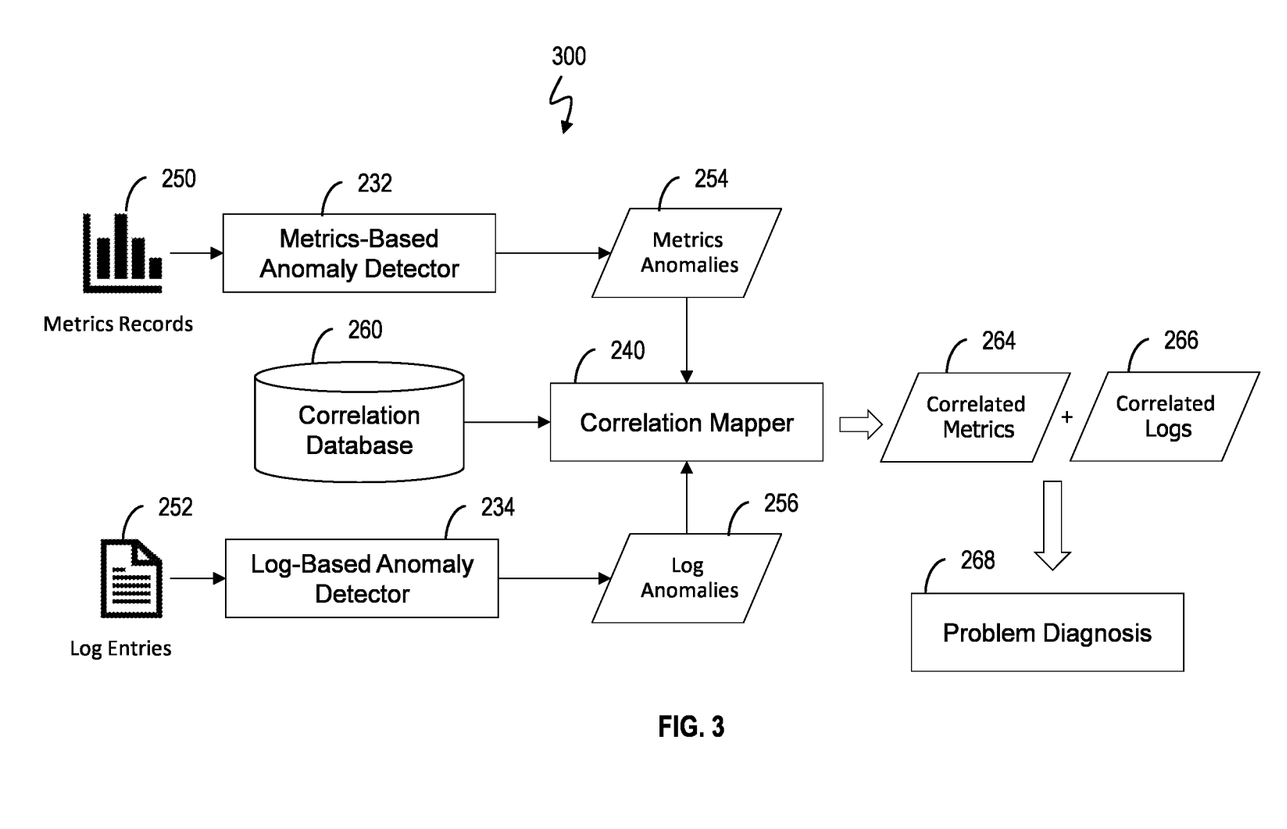
FIG. 3 is a block diagram of a dataflow for correlation-based multi-source problem diagnosis in accordance with one or more embodiments of the present invention.

Memory 206 of the computer systems 202 can store, for example, a plurality of metrics records 250, log entries 252, metrics anomalies 254, log anomalies 256, a correlation database 260, correlated metrics 264, correlated logs 266, and/or a problem diagnosis 268. A dataflow 300 of FIG. 3 illustrates interactions between various components of the software applications 230 and memory 206 of FIG. 2 for correlation-based multi-source problem diagnosis. The metrics-based anomaly detector 232 is configured to monitor a plurality of metrics in metrics records 250 to detect one or more metrics anomalies 254 in one or more monitored computer systems 210 as a metrics-based anomaly. The log-based anomaly detector 234 is configured to monitor a plurality of log identifiers in log entries 252 to detect one or more log anomalies 256 in one or more monitored computer systems 210 as a log-based anomaly. The correlation mapper 240 can search for a correlated log identifier in the correlation database 260 based on detecting a metrics-based anomaly and/or searching for a correlated metric in the correlation database 260 based on detecting a log-based anomaly. The correlation mapper 240 can output correlated metrics 264 and correlated logs 266. Related log information associated with a correlated log identifier of correlated logs 266 can be provided in a problem diagnosis 268 based on locating one or more log entries 252 including the correlated log identifier in a same time window as a metrics-based anomaly. Related metric information associated with a correlated metric of correlated metrics 264 can be provided in the problem diagnosis 268 based on locating one or more metrics records 250 including the correlated metric in a same time window as a log-based anomaly. As an example, a spike in memory utilization may be detected through a memory utilization metric. Searching for one or more log entries 252 occurring around the same time window, e.g., +/−100 milliseconds, +/−1 second, +/−1 minute, etc., may assist in identifying a specific job, component, and/or reason for an abnormal memory utilization spike. The correlation database 260 can identify pattern-based correlations of learned sequences and/or patterns between metrics and/or log identifiers, such that correlations need not be precisely aligned in time but can occur within or across one or more windows of time. The problem analyzer 242 can use the problem diagnosis 268 to provide additional information through alerts that may be presented by the user interface module 238 and to filter out reporting of potential false positive anomalies.

In some embodiments, the correlation database 260 can include a plurality of metric relationships defining correlations between multiple metrics. The correlation database 260 can also include a plurality of log relationships defining correlations between multiple log identifiers. The correlation database 260 can additionally include a plurality of metric-log relationships defining correlations between one or more pairs of metrics and log identifiers.

Figure 4:
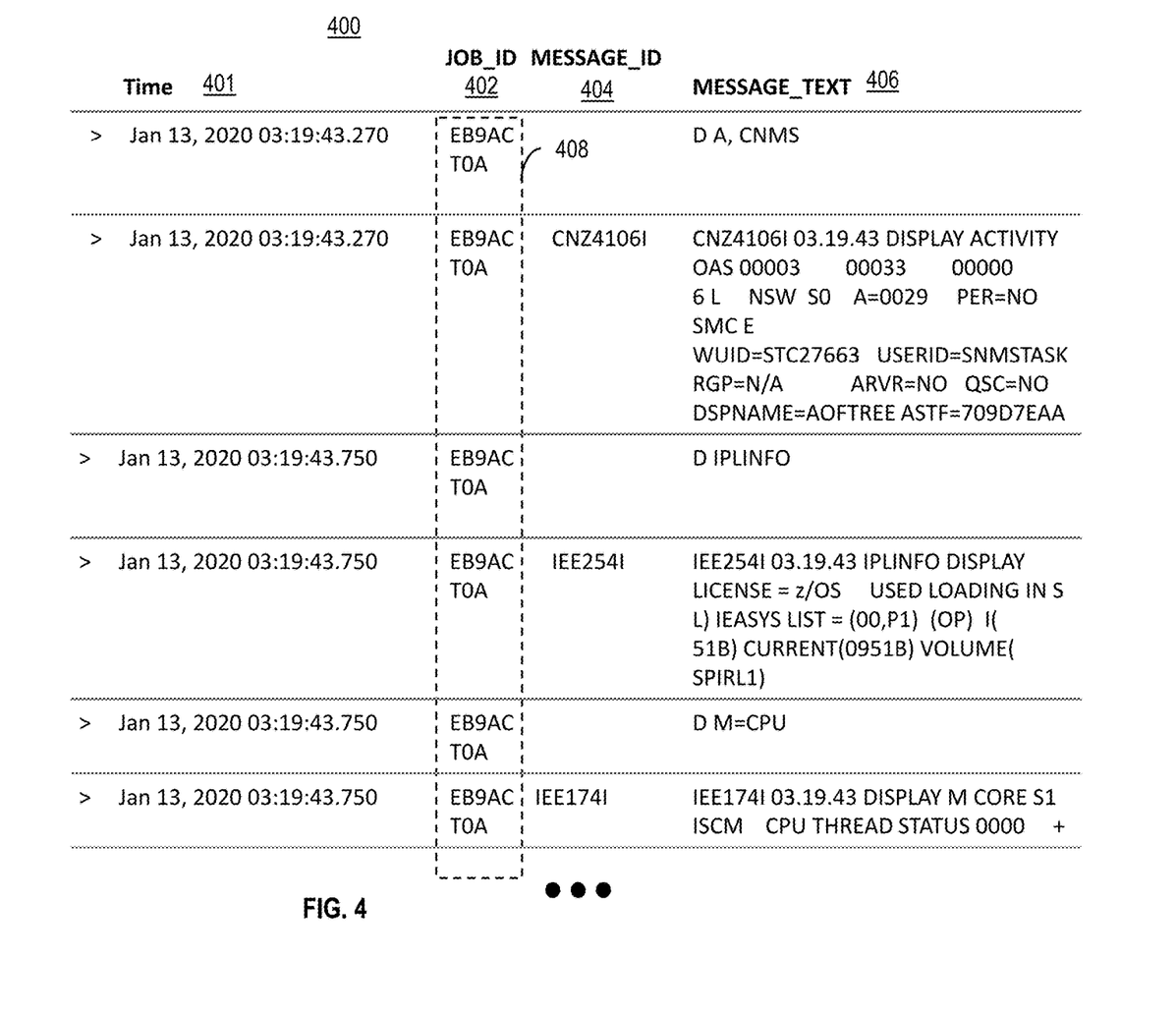
FIG. 4 depicts an example of a log in accordance with one or more embodiments of the present invention.

FIG. 4 depicts an example of a log sequence 400 that can include a time-based sequence of log entries associated with one or more job identifiers 402. Message identifiers 404, which can also be referred to as log identifiers 404, can indicate a log event with associated message text 406. Time data 401 can be used to determine how frequently log sequences occur. As illustrated in the example of FIG. 4, a group 408 of job identifiers 402 can be identified by as having a log sequence of message identifiers 404, for instance, CNZ4106I, followed by IEE254I and IEE174I. The log sequence 400 is an example of the log entries 252 of FIGS. 2 and 3.

Figure 5:
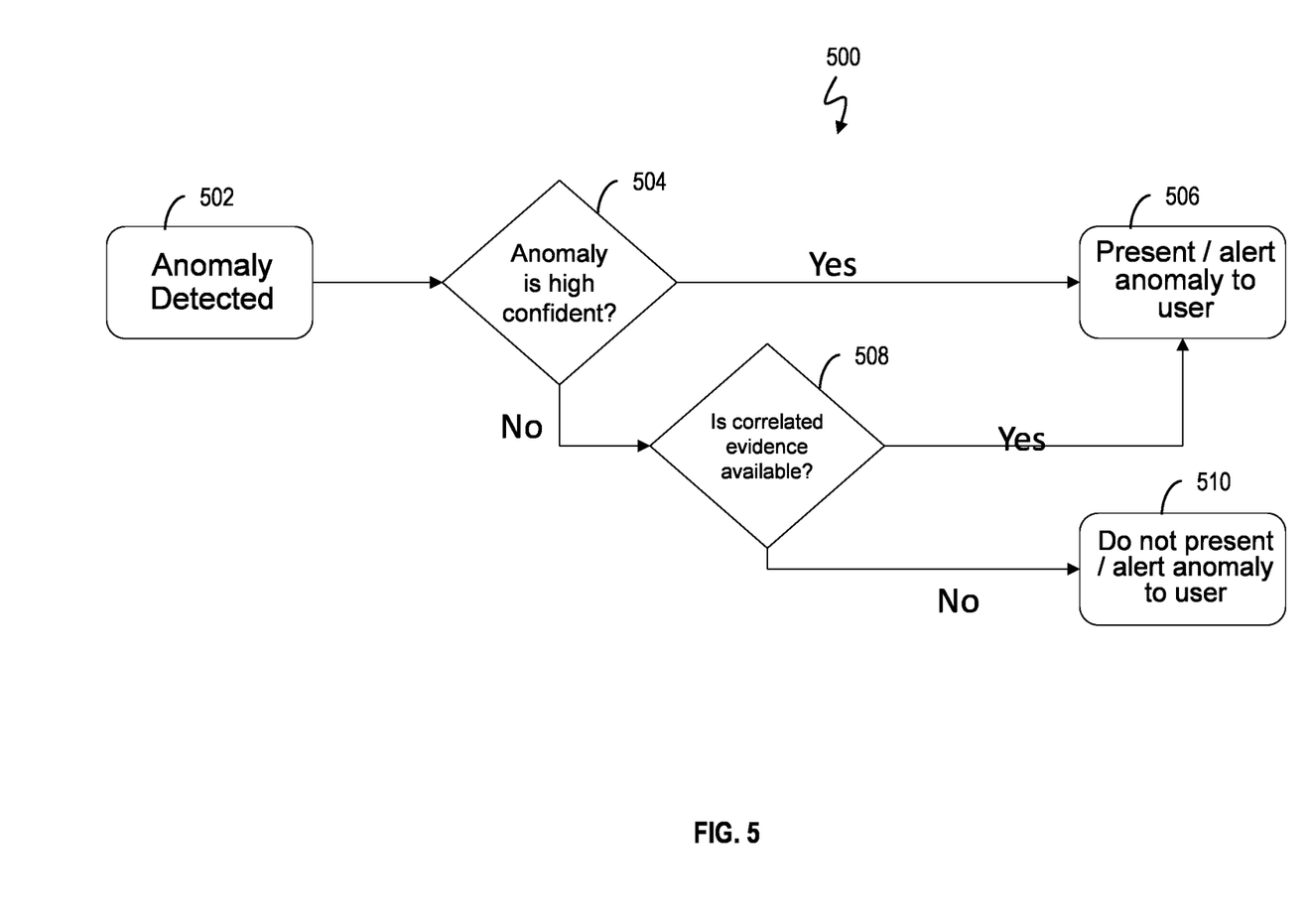
FIG. 5 is a flowchart of anomaly detection and reporting in accordance with one or more embodiments of the present invention.

FIG. 5 is a flowchart 500 of anomaly detection and reporting according to an embodiment. The flowchart 500 is described in reference to FIGS. 1-5 and may include additional steps not depicted in FIG. 5. Although depicted in a particular order, the blocks depicted in FIG. 5 can be rearranged, subdivided, and/or combined. At block 502, an anomaly can be detected using existing monitors of the computer systems 210, where anomaly detection includes a confidence level. At block 504, the problem analyzer 242 can determine whether a high confidence in the anomaly exists, for instance, by comparing the confidence level to a confidence threshold. At block 506, if the anomaly is detected with a confidence level that exceeds the confidence threshold, then an alert of the anomaly can be presented at block 506 to a user, such as a system administrator, through the user interface module 238 of FIG. 2. If at block 504, the anomaly is detected with a confidence level below the confidence threshold, then at block 508, the problem analyzer 242 can determine whether correlated evidence is available based on the problem diagnosis 268 of FIGS. 2 and 3. If correlated evidence is available, then block 506 can be performed and additional data associated with the problem diagnosis 268 can be provided as additional evidence; otherwise, at block 510, the anomaly can be filtered out to prevent providing an alert of the anomaly through the user interface module 238.

Figure 6:
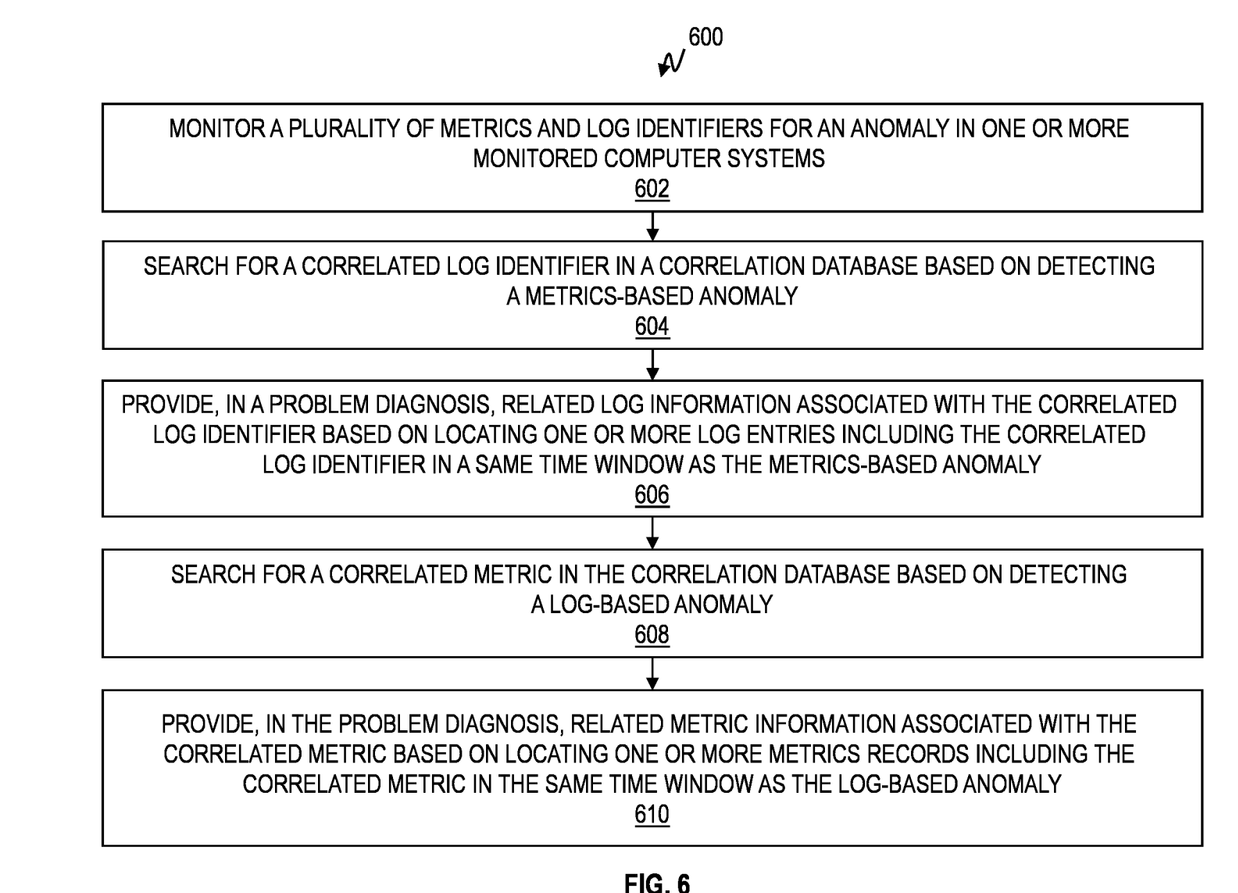
FIG. 6 is a flowchart of correlation-based multi-source problem diagnosis in accordance with one or more embodiments of the present invention.

FIG. 6 is a flowchart 600 of correlation-based multi-source problem diagnosis according to one or more embodiments of the invention. The flowchart 600 is described in reference to FIGS. 1-6 and may include additional steps not depicted in FIG. 6. Although depicted in a particular order, the blocks depicted in FIG. 6 can be rearranged, subdivided, and/or combined.

At block 602, the system 200 can monitor a plurality of metrics and log identifiers for an anomaly in one or more monitored computer systems 210. Metrics can be monitored by accessing metrics records 250 associated with operation of the one or more monitored computer systems 210. Log identifiers can be monitored by accessing log entries 252 of the one or more monitored computer systems 210. Monitoring can be performed in real-time, periodically, or can be event driven. An event that drives monitoring can be initiated from an application, such as problem analyzer 242, or another resource monitoring system (not depicted).

At block 604, the system 200 can search for a correlated log identifier in a correlation database 260 based on detecting a metrics-based anomaly by the metrics-based anomaly detector 232. For example, a metric identified as abnormal based exceeding a threshold or rate of change limit can be used as a look-up parameter in the correlation database 260 to identify other metrics and/or log identifiers that are known to be directly or indirectly related to the metric identified. These relationships can be learned using machine-learning techniques that may combine documentation, historical data, and/or expert knowledge to establish correlations.

At block 606, the system 200 can provide, in a problem diagnosis 268, related log information associated with the correlated log identifier based on locating one or more log entries 252 including the correlated log identifier in a same time window as the metrics-based anomaly. The time window may be configurable depending upon associated pattern relationships between the metrics and log identifiers. For example, correlations can be sequential, periodic, or contemporaneous. Therefore, a "same time window" can refer to time periods of various durations depending upon the relationship between metrics and log identifiers.

At block 608, the system 200 can search for a correlated metric in the correlation database 260 based on detecting a log-based anomaly by the log-based anomaly detector 234. The correlation database 260 can be indexed on log identifiers to search for correlated metrics and/or log identifiers having a direct or indirect correlation.

At block 610, the system 200 can provide, in the problem diagnosis 268, related metric information associated with the correlated metric based on locating one or more metrics records 250 including the correlated metric in the same time window as the log-based anomaly. The combination of metric and log data in the problem diagnosis 268 can increase available evidence for troubleshooting, while an absence of results can indicate a greater likelihood of a lower confidence report or a false positive.

In some embodiments, the problem diagnosis 268 can be provided based on determining that the anomaly occurred with a confidence level below a confidence threshold. The problem analyzer 242 can prevent reporting of the anomaly based on determining that the correlated log identifier is not located in the one or more log entries 252. Further, the problem analyzer 242 can prevent reporting of the anomaly based on determining that the correlated metric is not located in the one or more metrics records 250.

Technical advantages and benefits include using a correlation database to assist in anomaly diagnosis and reporting for one or more monitored computer systems. Using multiple data sources, such as logs and metrics, for problem diagnosis can result in improved accuracy in reporting detected anomalies by providing further evidence and filtering out potential false positive anomaly reports where correlated data cannot be found.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
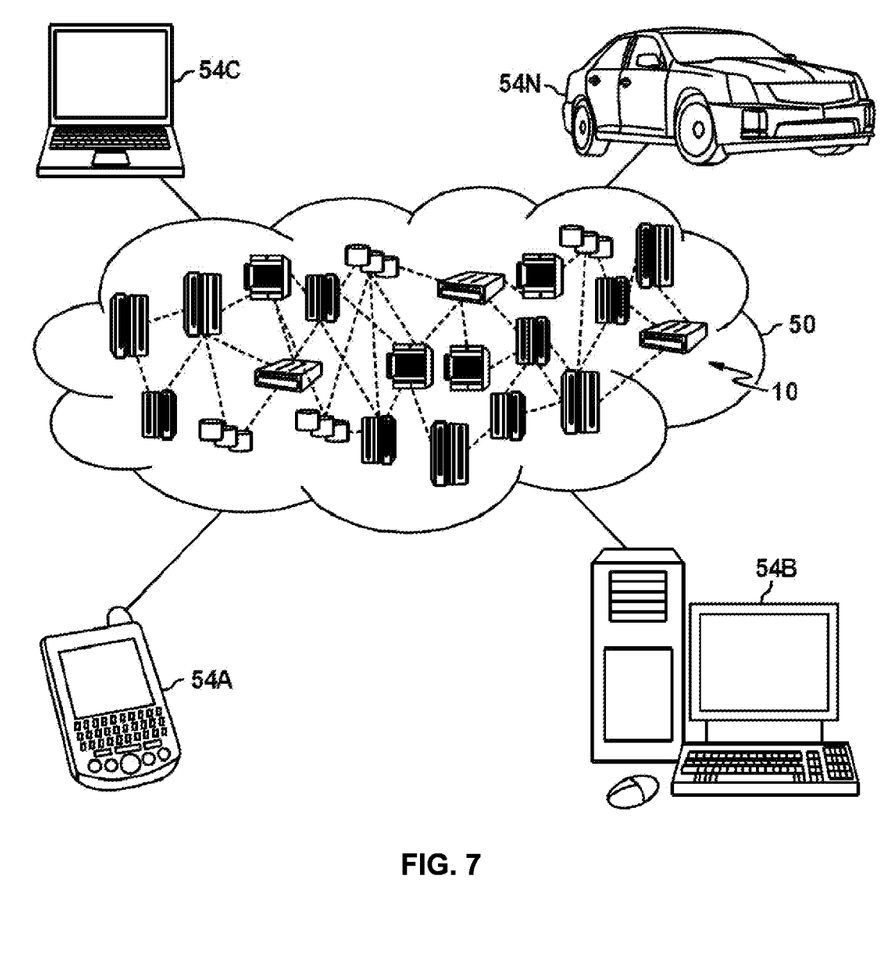
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
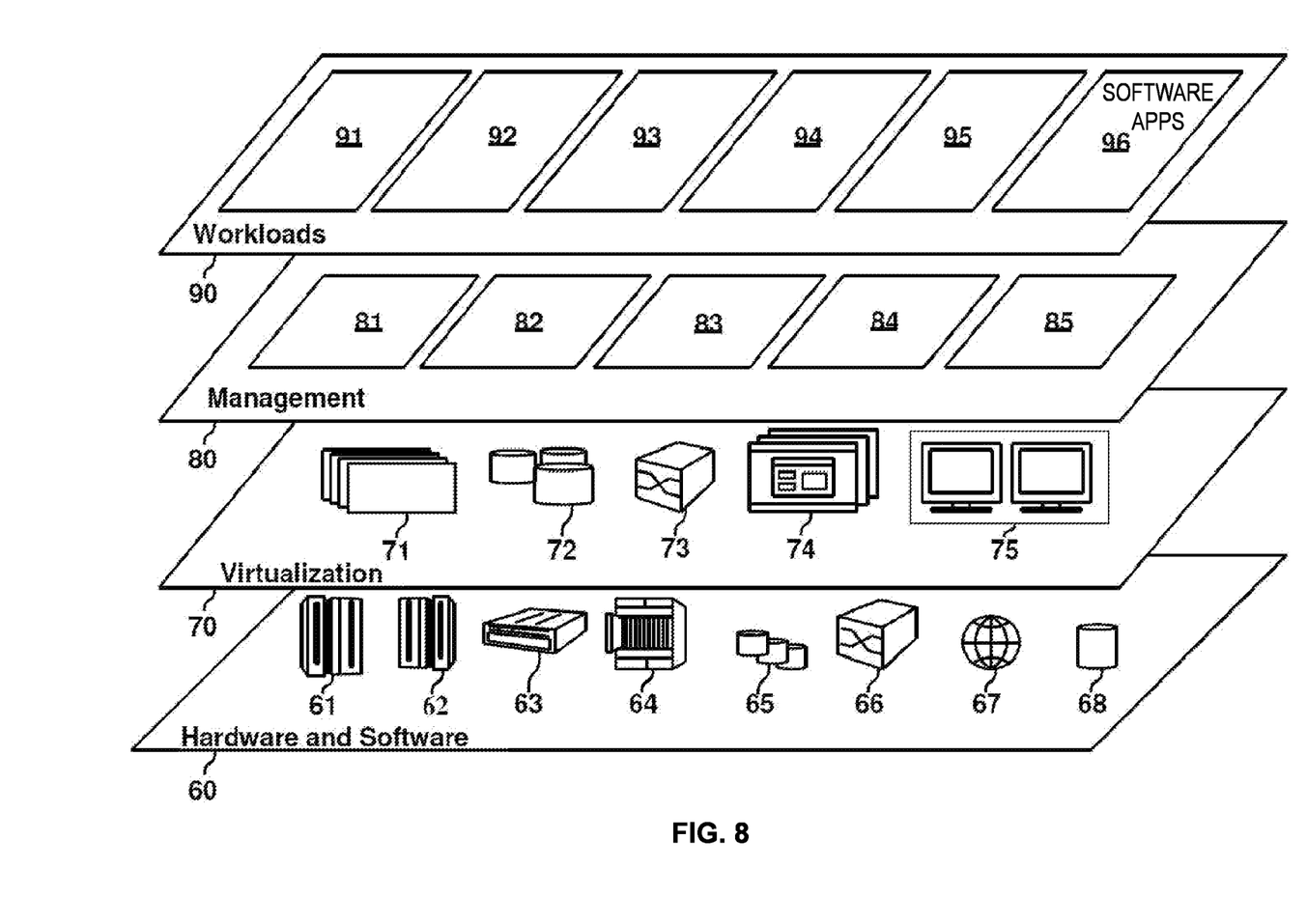
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 230 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    searching for a correlated log identifier in a correlation database based on detecting a metrics-based anomaly;
    providing, in a problem diagnosis, related log information associated with the correlated log identifier based on locating one or more log entries including the correlated log identifier in a same time window as the metrics-based anomaly;
    searching for a correlated metric in the correlation database based on detecting a log-based anomaly;
    providing, in the problem diagnosis, related metric information associated with the correlated metric based on locating one or more metrics records including the correlated metric in the same time window as the log-based anomaly, wherein the problem diagnosis is provided based on determining that an anomaly occurred with a confidence level below a confidence threshold and correlated evidence is available;
    preventing reporting of the anomaly based on determining that the correlated log identifier is not located in the one or more log entries; and
    preventing reporting of the anomaly based on determining that the correlated metric is not located in the one or more metrics records.

2. The computer-implemented method of claim 1, wherein the correlation database comprises a plurality of metric relationships defining correlations between multiple metrics.

3. The computer-implemented method of claim 2, wherein the correlation database comprises a plurality of log relationships defining correlations between multiple log identifiers.

4. The computer-implemented method of claim 3, wherein the correlation database comprises a plurality of metric-log relationships defining correlations between one or more pairs of metrics and log identifiers.

5. A system comprising:
a memory having computer readable instructions; and
one or more processors for executing the computer readable instructions, the computer readable instructions controlling the one or more processors to perform operations comprising:
 searching for a correlated log identifier in a correlation database based on detecting a metrics-based anomaly;
 providing, in a problem diagnosis, related log information associated with the correlated log identifier based on locating one or more log entries including the correlated log identifier in a same time window as the metrics-based anomaly;
 searching for a correlated metric in the correlation database based on detecting a log-based anomaly;
 providing, in the problem diagnosis, related metric information associated with the correlated metric based on locating one or more metrics records including the correlated metric in the same time window as the log-based anomaly, wherein the problem diagnosis is provided based on determining that an anomaly occurred with a confidence level below a confidence threshold and correlated evidence is available;
 preventing reporting of the anomaly based on determining that the correlated log identifier is not located in the one or more log entries; and
 preventing reporting of the anomaly based on determining that the correlated metric is not located in the one or more metrics records.

6. The system of claim 5, wherein the correlation database comprises a plurality of metric relationships defining correlations between multiple metrics.

7. The system of claim 6, wherein the correlation database comprises a plurality of log relationships defining correlations between multiple log identifiers.

8. The system of claim 7, wherein the correlation database comprises a plurality of metric-log relationships defining correlations between one or more pairs of metrics and log identifiers.

9. A computer program product comprising a computer readable storage medium having program instructions embodied therewith, the program instructions executable by a processor to cause the processor to perform operations comprising:
 searching for a correlated log identifier in a correlation database based on detecting a metrics-based anomaly;
 providing, in a problem diagnosis, related log information associated with the correlated log identifier based on locating one or more log entries including the correlated log identifier in a same time window as the metrics-based anomaly;
 searching for a correlated metric in the correlation database based on detecting a log-based anomaly;
 providing, in the problem diagnosis, related metric information associated with the correlated metric based on locating one or more metrics records including the correlated metric in the same time window as the log-based anomaly, wherein the problem diagnosis is provided based on determining that an anomaly occurred with a confidence level below a confidence threshold and correlated evidence is available;
 preventing reporting of the anomaly based on determining that the correlated log identifier is not located in the one or more log entries; and
 preventing reporting of the anomaly based on determining that the correlated metric is not located in the one or more metrics records.

10. The computer program product of claim 9, wherein the correlation database comprises a plurality of metric relationships defining correlations between multiple metrics.

11. The computer program product of claim 9, wherein the correlation database comprises a plurality of log relationships defining correlations between multiple log identifiers.

12. The computer program product of claim 11, wherein the correlation database comprises a plurality of metric-log relationships defining correlations between one or more pairs of metrics and log identifiers.

* * * * *